US012712962B2

(12) United States Patent
Amir et al.

(10) Patent No.: US 12,712,962 B2
(45) Date of Patent: Aug. 18, 2026

(54) APPARATUS, SYSTEM AND METHOD FOR EMERGENCY COMMUNICATIONS

(71) Applicant: Essence Security International (E.S.I.) Ltd., Herzlia Pituach (IL)

(72) Inventors: Ohad Amir, Herzlia (IL); Jonathan Mark Schnapp, Tel Aviv (IL)

(73) Assignee: Essence Security International (E.S.I.) Ltd., Herzlia Pituach (IL)

( * ) Notice: Subject to any disclaimer, the term of this patent is extended or adjusted under 35 U.S.C. 154(b) by 270 days.

(21) Appl. No.: 18/695,318

(22) PCT Filed: Oct. 10, 2022

(86) PCT No.: PCT/IL2022/051076

§ 371 (c)(1),
(2) Date: Mar. 25, 2024

(87) PCT Pub. No.: WO2023/062628

PCT Pub. Date: Apr. 20, 2023

(65) Prior Publication Data

US 2025/0008015 A1 Jan. 2, 2025

(30) Foreign Application Priority Data

Oct. 13, 2021 (GB) ..................................... 2114627

(51) Int. Cl.
*H04M 11/04* (2006.01)
*G10L 13/02* (2013.01)
(Continued)

(52) U.S. Cl.
CPC ......... *H04M 1/72436* (2021.01); *G10L 13/02* (2013.01); *G10L 25/60* (2013.01);
(Continued)

(58) Field of Classification Search
CPC ......... H04W 4/90; H04W 4/023; H04W 8/20; H04W 4/029; G08B 25/016;
(Continued)

(56) References Cited

U.S. PATENT DOCUMENTS 10,516,777 B1 12/2019 Kalkundrikar et al.
2009/0190727 A1 7/2009 Metzger et al.
(Continued)

FOREIGN PATENT DOCUMENTS

WO 2023062628 A1 4/2023

OTHER PUBLICATIONS

Foreign Communication from a Related Counterpart Application, International Search Report and Written Opinion dated Dec. 22, 2022, International Application No. PCT/IL2022/051076 filed on Oct. 10, 2022.

(Continued)

*Primary Examiner* — Khai Tran
(74) *Attorney, Agent, or Firm* — Conley Rose, P.C.

(57) ABSTRACT

A apparatus comprises at least one processor configured to: instruct transmission of end-user audio data to a remote system over a voice call, wherein the end-user audio data represents a sensed audio signal to convey speech of an end user and is transmitted in real time with respect to sensing of the audio signal; and in response to a determination that, during the voice call, the voice call is of insufficient quality, perform a messaging process, the messaging process comprising: presenting an audio output to the end user; capturing an audio response of the end user; and instructing transmission of a message to the remote system, wherein the message comprises a representation of the captured audio response, and wherein the transmission of the message is not constrained to be transmitted in real time with respect to sensing of said captured audio response.

20 Claims, 7 Drawing Sheets

(51) Int. Cl.

| | |
|---|---|
| ***G10L 25/60*** | (2013.01) |
| ***H04L 65/65*** | (2022.01) |
| ***H04L 65/80*** | (2022.01) |
| ***H04M 1/72421*** | (2021.01) |
| ***H04M 1/72436*** | (2021.01) |
| ***H04M 3/22*** | (2006.01) |

(52) U.S. Cl.

CPC .............. *H04L 65/65* (2022.05); *H04L 65/80* (2013.01); *H04M 1/72421* (2021.01); *H04M 3/2236* (2013.01)

(58) Field of Classification Search

CPC ... G08B 27/001; G08B 25/10; H04L 12/1895; H04L 65/80; H04M 1/72418; H04M 1/72436

USPC .......................................................... 455/404

See application file for complete search history.

(56) References Cited

U.S. PATENT DOCUMENTS

| | | | | |
|---|---|---|---|---|
| 2018/0199179 | A1* | 7/2018 | Rauner | G08B 25/10 |
| 2019/0069145 | A1 | 2/2019 | Dantsker | |
| 2020/0294382 | A1* | 9/2020 | Pradhan | G01P 13/00 |
| 2023/0179628 | A1* | 6/2023 | Porras | G06F 40/30<br>726/22 |

OTHER PUBLICATIONS

Foreign Communication from a Related Counterpart Application, Combined Search and Examination Report dated Apr. 1, 2022, United Kingdom Application No. 2114627.9 filed on Oct. 13, 2021.

Foreign Communication from a Related Counterpart Application, International Preliminary Report of Patentability dated Apr. 25, 2024, International Application No. PCT/IL2022/051076 filed on Oct. 10, 2022.

* cited by examiner

APPARATUS, SYSTEM AND METHOD FOR EMERGENCY COMMUNICATIONS

CROSS-REFERENCE TO RELATED APPLICATIONS

The present application is a filing under 35 U.S.C. 371 as the National Stage of International Application No. PCT/IL2022/051076, filed Oct. 10, 2022, entitled "APPARATUS, SYSTEM AND METHOD FOR EMERGENCY COMMUNICATIONS," which claims priority to Great Britain Patent Application No. 2114627.9 filed with the Intellectual Property Office of the United Kingdom on Oct. 13, 2021, both of which are incorporated herein by reference in their entirety for all purposes.

TECHNICAL FIELD

The present invention relates in some aspects to an apparatus, system and method, for example an apparatus of an emergency call capable system and a method of operation of the apparatus.

BACKGROUND

An emergency call capable system may comprise one or more emergency call capable devices configured to make emergency calls to a monitoring station, for example an Alarm Receiving Center (ARC). Such emergency call capable devices may be provided in security (e.g. intrusion detection), care (e.g. health monitoring/fall detection/distress actuators) and/or safety (e.g. fire) systems.

For example, an emergency call may be initiated by a site-installed control hub of an emergency call capable system. The control hub may initiate a call in response to an event sensed by a sensing or monitoring device (e.g. motion sensor, door/window sensor, active reflective wave detectors such as radar, sonar, lidar, etc).

Alternatively, the sensing or monitoring device may initiate the call. For example, the call may be initiated by installed sensing or monitoring devices that communicate to a remote server by Wi-Fi® or cellular rather than via a control hub. In one example, the call may be initiated by one or more mobile personal emergency response system (mPERS) devices.

The call may alternatively be initiated by the monitoring station in response to the monitoring station receiving a notification of the event.

In any case, there are instances in which an emergency call may be connected but in which the emergency call has unsatisfactory quality. For example, there may be too high a proportion of packet loss. The poor quality may result in the person at the monitoring station being unable to ask important questions or hear what is being said by the person for whom the call is made.

It is therefore an aim of the present disclosure to obviate or at least mitigate at least one of the above or other shortcomings of the prior art or provide a useful alternative in the marketplace.

Reference to any prior art in this specification is not an acknowledgement or suggestion that this prior art forms part of the common general knowledge in any jurisdiction, or globally, or that this prior art could reasonably be expected to be understood, regarded as relevant/or combined with other pieces of prior art by a person skilled in the art.

SUMMARY

In a first aspect, there is provided an apparatus comprising at least one processor configured to:

instruct transmission of end-user audio data to a remote system over a voice call, wherein the end-user audio data represents a sensed audio signal to convey speech of an end user and is transmitted in real time with respect to sensing of the audio signal; and in response to a determination that, during the voice call, the voice call is of insufficient quality, perform a messaging process, the messaging process comprising: presenting an audio output to the end user; capturing an audio response of the end user; and instructing transmission of a message to the remote system, wherein the message comprises a representation of the captured audio response, and wherein the transmission of the message is not constrained to be transmitted in real time with respect to sensing of said captured audio response.

By changing from real-time voice transmission to a messaging process, communication with an end user may be reliably continued when the quality of voice transmission is poor. This may allow important communication to be reliably made with the end user as part of an emergency call. Important information may be conveyed in a message comprising a representation of a captured audio response by the end user. By transmitting a message that is not constrained to be transmitted in real time, an accuracy of the communication may be improved.

The at least one processor may be further configured to initiate the voice call. The initiating of the voice call may be in response to a detected emergency event.

The detected emergency event may comprise at least one of a detected fall, a detected distress input, a detected panic button input, a detected voice panic input.

The at least one processor may be further configured to determine that the detected emergency event has occurred by processing at least one signal received from at least one device selected from a group consisting of: a motion sensor; a camera; a health and/or care monitoring device; a fall detector; a distress device; and/or a panic button.

Transmitting of the audio data in real time may be provided by configuring a quality of service, QoS, to be for the voice call.

The at least one processor may comprise a codec configured to use in processing the sensed audio signal for transmission as a voice call. The codec may be further configured for use in processing audio data for transmission as a message. The at least one processor may further comprise a second, different codec configured for use in processing the captured audio response for transmission as a message.

The apparatus may further comprise a first output buffer configured to buffer the end-user audio data for transmission in the voice call, and a second output buffer configured to buffer the audio response, wherein the second buffer is larger than the first buffer.

The first output buffer may be configured to buffer the end-user audio data by contributing a delay of no more than 100 ms to transmission of the end-user audio data. The second output buffer may be configured to be unconstrained by real-time transmission by contributing a delay of more than 100 ms, e.g. more than 3 seconds, more than 5 seconds or more than 10 seconds, and in some embodiments less than 60 seconds, to transmission of the message.

The first output buffer and second output buffer may be implemented as a single output buffer having selectable size.

The transmission of the audio data may comprise transmission to a first address. The transmission of the message may comprise transmission to a second, different address.

Alternatively, for the case of the voice call, instead of there being a buffering of the end-user audio data, the output of the codec may be transmitted without such buffering. Thus there may be either less or no buffering of the end-user audio data in transmission in the voice call compared with transmission of the audio response.

Thus, in some embodiments, the apparatus comprises a first output buffer, or no output buffer, configured to buffer the end-user audio data before transmitting the end-user audio data over the voice call, wherein the first output buffer contributes a delay of no more than 100 ms. and a second output buffer configured to buffer the audio response. Furthermore, in some embodiments, the apparatus comprises a second output buffer configured to buffer the audio response, wherein the second output buffer contributes a delay of more than 10 seconds to transmission of the message.

The transmission of the audio data may be to a voice server of the remote system. The transmission of the message may be to a data server of the remote system.

The transmission of the audio data may comprise transmission using a first protocol and the transmission of the message may comprise transmission using a second, different protocol. The first protocol may be User Datagram Protocol, UDP. The second protocol may be Transmission Control Protocol, TCP.

The transmission of the audio data may be via a first channel and the transmission of the message may be via a second, different channel.

The transmission of the audio data may be via cellular communication. The transmission of the message may be via Ethernet communication.

The at least one processor may be configured to obtain the determination that the voice call is of insufficient quality based on network performance parameters determined by a recipient of the end user audio data, the network performance parameters being received by the apparatus.

The network performance parameters may include one of more of: jitter, packet loss, latency and bit error rate.

The voice call may be determined to be of insufficient quality by any one or more of the network performance parameters not meeting performance requirements defined by a voice call protocol used for the voice call. Such a voice call protocol may operate from layer 4 (transport layer) and/or higher, or from layer 5 (session layer) and/or higher, of the Open Systems Interconnection model (OSI model). Further, a higher level of performance may be demanded by determining that the voice call is of insufficient quality if any one of more of the network performance parameters fails to meet a test that is more stringent than defined by a voice protocol for the voice call.

The determination that the voice call is of insufficient quality may be received from a remote device. The remote system may comprise the remote device.

The determination that the voice call is of insufficient quality may be obtained based on a measurement of network reception at the apparatus, wherein the apparatus assumes the voice call is of insufficient quality based on a determination that network reception is below a predetermined threshold.

The at least one processor may be further configured to terminate the voice call in response to at least one of: the determination that the voice call is of insufficient quality; starting to capture the audio response of the end user; finishing capturing the audio response of the end user; transmitting the message to the remote system.

The message may comprise a plurality of data packets.

The message may comprise a recording of the captured audio response.

The message may comprise a transcription of the captured audio response. The at least one processor may be configured to perform speech to text processing of the captured audio response to obtain the transcription.

The message may comprise a code that is indicative of content of the captured audio response.

The code may correspond to a selection from a plurality of predefined expected audio responses that is determined to match said audio response.

The messaging process may comprise a messaging dialogue between the end user and a remote system or a human operator of the remote system. The messaging dialogue may further comprise receiving signals representative of an incoming message received from the remote system. The incoming message may identify information to be presented to the end user, and instruct a corresponding audio output to the end user.

The incoming message may comprise an audio recording of an operator. The audio output may comprise outputting the recording.

The incoming message may comprise a transcription of an audio recording of an operator. The at least one processor may be configured to perform text to speech processing of the incoming message to obtain the audio output, the audio output comprising an audio version of the transcription.

The incoming message may comprise a code identifying the information to be presented to the end user. The at least one processor may be configured to select the audio output from a plurality of known audio outputs based on the code.

The at least one processor may be further configured to, in response to receipt of the incoming message, capture a further audio response of the user of the apparatus and instruct transmission of a further message comprising a representation of the captured further audio response.

The capturing of the audio response of the end user may comprise capturing a sensed audio signal for a voice capture period having a duration that is at least one of: no longer than a predefined maximum duration; and a duration determined in dependence on output of a voice detection process. The duration may be a lesser of the predefined maximum duration and the duration determined in dependence on the output of the voice detection process.

The at least one processor may be configured to determine an end of the voice capture period in response to the output of the voice detection process indicating that there has been no voice detected for a predetermined minimum time.

The voice detection process may comprises comparing measured acoustic energy or acoustic power to a threshold value.

The predefined maximum duration may be no more than 60 seconds, optionally no more than 30 seconds.

The apparatus may further comprise an input sound transducer for sensing the audio signal. The apparatus may further comprise an output sound transducer for playing sound to the end user.

The apparatus may further comprise a communications apparatus for transmitting the voice call and the message.

The apparatus may comprise a personal emergency response system, PERS.

The apparatus may comprise a control hub. The apparatus may further comprise a voice extender.

The apparatus may be a mobile personal emergency response system, mPERS, device.

In a second aspect, there is provided a system comprising an apparatus as claimed or described herein, and at least one device from which the apparatus can receive a signal and detect the emergency event based on the received signal.

The at least one device may be selected from a group consisting of: a motion sensor; a camera; a health and/or care monitoring device; a fall detector; a distress device; and/or a panic button.

In a third aspect, which may be provided independently, there is provided a server system comprising at least one processor configured to: receive, from an apparatus, end-user audio data over a voice call, wherein the end-user audio data represents a sensed audio signal transmitted to the server system in real time with respect to sensing of the audio signal; and in response to a determination that, during the voice call, the voice call is of insufficient quality, perform a messaging process, the messaging process comprising: instructing transmission of a message to the apparatus, wherein the message identifies information to be presented to the end user, and wherein the transmission of the message is not constrained to be transmitted in real time.

The at least one processor may be configured to receive the message from a call center system.

The at least one processor may be configured to receive the message from an Alarm Receiving Center, ARC, comprising a call center system.

The at least one processor may be further configured to receive an outgoing message from the apparatus and to instruct transmission of the outgoing message to the call center system.

The determination that the voice call is of insufficient quality may be received from the call center system.

The server system may comprise or form part of an Alarm Receiving Center, ARC. The server system may comprise or form part of a call center system. The call center system may form part of the Alarm Receiving Center.

The at least one processor may be further configured to receive an input from an operator and to instruct the transmission of the message in response to the input from the operator. The input from the operator may comprise audio input. The input from the operator may comprise a selection from a predetermined list of message options.

The at least one processor may be further configured to receive the determination that the voice call is of insufficient quality from an operator.

The determination that the voice call is of insufficient quality may be received from the apparatus.

The at least one processor may be configured to receive audio data from a plurality of apparatuses and to instruct transmission of messages to each of the plurality of apparatuses.

The message may comprise an audio recording of an operator. The message may comprise a transcription of an audio recording of an operator. The message may comprise a code identifying the information to be presented to the end user.

In a fourth aspect, which may be provided independently, there is provided a method comprising: instructing transmission of end-user audio data to a remote system over a voice call, wherein the end-user audio data represents a sensed audio signal to convey speech of an end user and is transmitted in real time with respect to sensing of the audio signal; and in response to a determination that, during the voice call, the voice call is of insufficient quality, performing a messaging process, the messaging process comprising: presenting an audio output to the end user; capturing an audio response of the end user; and instructing transmission of a message to the remote system, wherein the message comprises a representation of the captured audio response, and wherein the transmission of the message is not constrained to be transmitted in real time with respect to sensing of said captured audio response.

In a fifth aspect, there is provided a system configured to perform a method as claimed or described herein.

In a sixth aspect, there is provided a computer program product comprising instructions which, when the program is executed by a computer, cause the computer to carry out a method as claimed or described herein. The computer program product may comprise a transient memory and/or a non-transient memory storing the instructions.

In a seventh aspect, there is provided a computer readable data carrier comprising instructions which, when executed by a computer, cause the computer to carry out a method as claimed or described herein. The computer readable data carrier may consist of a non-transient computer readable storage medium. Alternatively, the computer readable data carrier may comprise a computer receivable signal.

Further, the term "computer" as used herein may be any electronic processing device or system, for example as described herein.

Features in one aspect may be applied as features in any other aspect, in any appropriate combination. For example, method features may be provided as device features or vice versa.

Features of a device or system of one aspect may be provided as features of a device or system of another aspect. Features of a method of one aspect may be provided as features of a method of another aspect. Features of a device may be distributed between multiple devices. Features of a system may be distributed between multiple systems.

BRIEF DESCRIPTION OF THE SEVERAL VIEWS OF THE DRAWINGS

Embodiments will now be described by way of example only, and with reference to the accompanying drawings, of which.

DETAILED DESCRIPTION

As used herein, except where the context requires otherwise, the terms "comprises", "includes", "has", and grammatical variants of these terms, are not intended to be exhaustive. They are intended to allow for the possibility of further additives, components, integers or steps.

Figure 1:
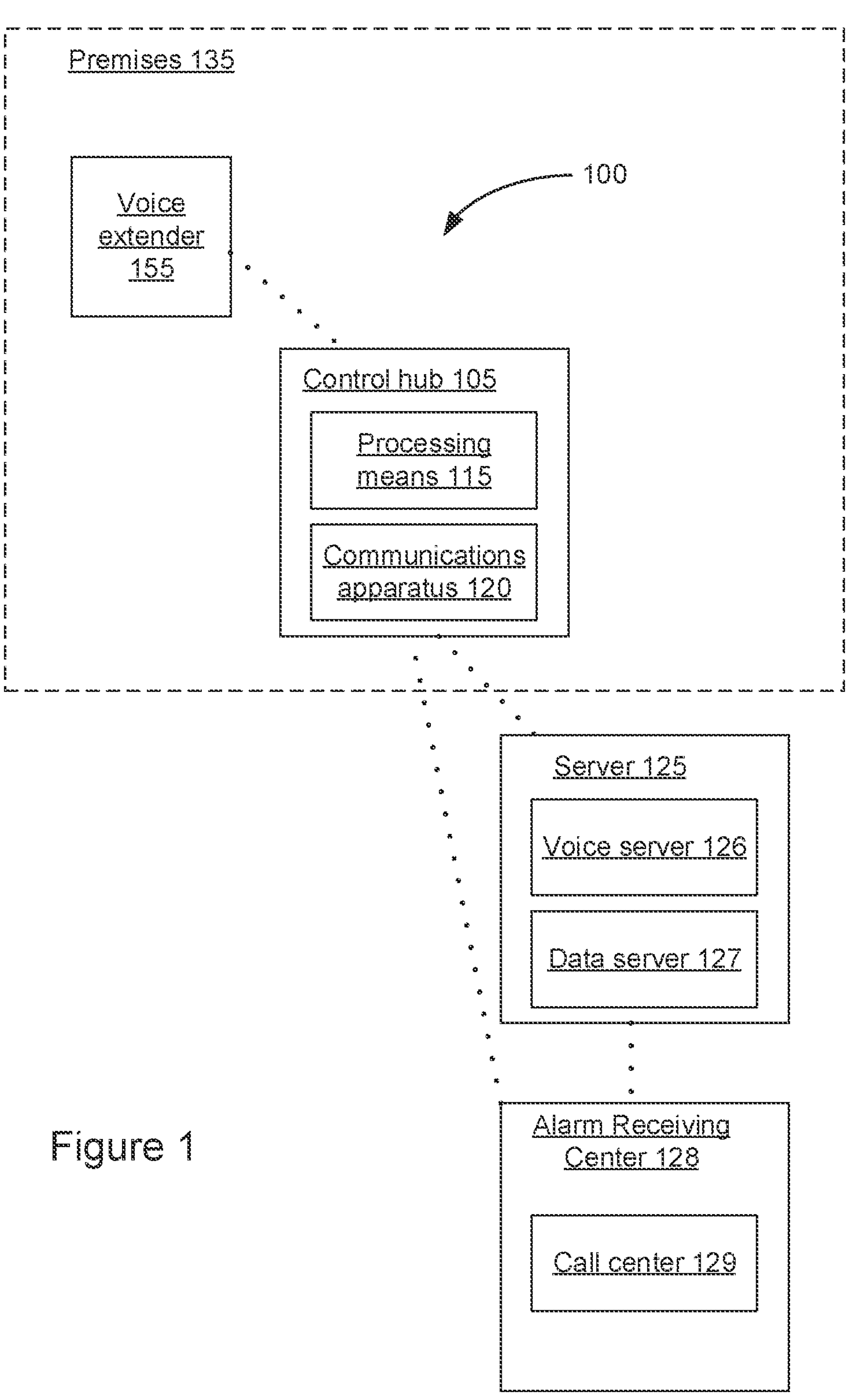
FIG. 1 depicts an example of an emergency call capable system in communication with a server and an Alarm Receiving Center (ARC)

FIG. 1 depicts an example of an emergency call capable system, generally denoted 100. The example system 100 is an emergency call capable system for monitoring at least one person, e.g. for their care. The person may also be described as a user or end user of the system. In this example, the system includes components installed on a premises 135 at which they reside, such as independent-living facilities for the elderly. However, in other embodiments the system may not be bound to any premises. Further, it will be understood that this embodiment is provided for purposes of example only, and the other emergency call capable systems for different purposes may fall within the scope of the disclosure. For example, in other embodiments the emergency call capable system 100 may additionally or alternatively comprise an intruder alarm system capable of initiating emergency calls in response to a detected security threat. In yet further embodiments, the emergency call capable system 100 may additionally or alternatively comprise a monitoring system including environmental sensors (not shown) to detect a threatening environmental condition such a fire, flood, chemical leak or the like, wherein the emergency call capable system is capable of directly or indirectly alerting emergency services in the event of an emergency. In any case, the emergency call may be to a third party, e.g. an operator at an Alarm Receiving Center, to enable a conversation in relation to an event that triggered the call.

In the example of FIG. 1, the system 100 of comprises a control hub 105 that is installed at the premises 135. The control hub 105 comprises processing means 115 comprising at least one processor, and a communications apparatus 120. The communications apparatus 120 comprises a network interface comprising at least one transmitter and receiver, or at least one transceiver, for cellular communication, e.g. according to 3GPP technologies, and/or and Wi-Fi® or Ethernet or a other wireless or wired gateway technologies for accessing a Wide Area Network (e.g. the Internet). Additionally, the local network interface may provide Bluetooth®, e.g. Bluetooth® Low energy (BLE), IEEE 802.15.4 compliant communication, and/or some other local communication protocol for communications between devices within the premises.

The control hub 105 may be communicatively coupled to a wearable device, e.g. a pendant on a lanyard, worn by a person being monitored. The wearable device comprises a distress button and/or fall detection functionality (e.g. based on an inbuilt accelerometer). Optionally the control hub may be equipped with a distress button, a speaker and a microphone to thereby act as a Personal Emergency Response System (PERS). The wearable device may be a peripheral device that operates with the PERS.

The control hub 105 may additionally or alternatively be notified of potential emergency events by various activity monitoring devices, e.g. motion sensors, door/window sensors, pressure sensors in floors/door mats, etc, which may be dispersed about the premises and which may use the local network interface to communicate with the control hub. Some such sensors, e.g. a motion sensor, may be integrated into the control hub itself.

The system 100 may further comprise a voice extender device 155 located within the premises 135. It is known to implement a voice extender device 155 in an emergency call capable system to provide two-way audio communications with a control hub 105. The voice extender 155 comprises microphone and speaker components (not shown in FIG. 1). The voice extender 155 is communicatively coupled to the control hub 135 using any suitable wireless communication method, for example via the local network interface. In other embodiments, any suitable number of voice extenders 155 may be included in system 100. The voice extender(s) and/or the control hub 105 may have an ability to sense voice from a person, using an onboard microphone, to detect based an emergency event based on the person's voice.

The control hub 105 and optional voice extender(s) 155 are located within the premises 135. The control hub 105 and voice extender(s) 155 may be located in different parts of the premises 135.

For example, if the premises 135 is a dwelling, the control hub 105 and voice extender(s) 155 may be installed in different rooms.

The voice extender(s) 155 and/or the control hub 105 may have an ability to sense voice from a person, using an onboard microphone, to detect an emergency event based on the person's voice.

Upon detection of an emergency event the control hub 105 may transmit an event notification to a server 125 that interfaces with or forms part of the system 100.

A location of the server 125 is remote from the premises 135 so communication to the server 125 from the hub 100 is via a Wide Area Network (not shown), e.g. the Internet. The server 125 may also be referred to as a remote system.

The server 125 comprises a data server 127, which amongst other functions, receives the event notification and in turn notifies an Alarm Receiving Center (ARC) of details about the event, based on metadata associated with the event notification. The server 125 may also include a voice server 126, e.g. a Voice over Internet Protocol (VOIP) server.

The control hub 105 may be configured to communicate with the server 125 via PSTN or Ethernet. The control hub 105 may be configured to communicate with the server 125 over a cellular network using a cellular standard, for example a 3GPP standard, 4G, LTE®, 5G, or another standard. The control hub 105 may be configured to communicate with the server 125 using any suitable wireless communication method, for example using a Wi-Fi® protocol based on IEEE 802.11.

In addition to notifying the data server 127 of the event, the control hub 105 may also initiate a call to the ARC. The call may be to the ARC or to the voice server 126 which in turn initiates a voice call to the ARC to establish a voice call connection between the control hub 105 to the ARC.

In other embodiments, the control hub 105 may receive a call initiated by a remote device in response to the remote device receiving a notification of the event. For example, the remote device may be the ARC. Alternatively, the remote device may be the voice server 126, which may be triggered by the data server 127 to initiate a voice call to the control hub 105 in response to data server 127 receiving the notification of the event. The voice server 127 may also initiate a voice call to the ARC and connect that call to the control hub 105 to, in effect, administer a call between the control hub 105 and the ARC.

As will be appreciated, such voice calls as referred to herein may be a VoIP call or any other form of voice call known to the person skilled in the art.

In another embodiment, rather than having premises based components (i.e. a control hub 100, and optional voice extender(s) 155, etc) the functions of the system 100, or at least a part of the system 100, may be provided by a mobile personal emergency response system (mPERS) device 200. Thus, the call initiating, call receiving, message sending and message receiving actions described herein for the control hub 100 may instead be for the mPERS device 200. The mPERS device 200 may provide the same functionality as the PERS, but in a wearable form. For example, the mPERS device 200 may be a pendant or other wearable device as described above, but further including a cellular communication interface to directly interface with a cellular network and thereby to server 125 and/or to the ARC 128. For example, the mPERS device 200 may be configured to communicate with the server 125 over a cellular network using a cellular standard, for example a 3GPP standard, 4G (e.g. LTE®), 5G, or another standard. The mPERS device 200 may include an inbuilt microphone and speaker so that the person may use the mPERS device 200 to communicate with an operator at a call center 129 of the Alarm Receiving Center 128 by speaking into the mPERS device 200. For example, the person may use the mPERS device 200 to communicate with the operator if the person is in distress or has fallen. In an embodiment, the mPERS device 200 may transmit an emergency event notification directly to server 125 over a cellular network, and may initiate or receive a call to or from the ARC or voice server 126.

The ARC 128 comprises a call center 129, typically having human operators for answering calls in an emergency. The call center 129 may comprise one or more communications apparatuses for receiving a call over the PSTN, e.g. telephones. The call center 129 may further comprise one or more communications apparatuses for receiving calls and/or data by any suitable method, for example, by cellular communication, by Ethernet communication and/or by Wi-Fi® communication using a protocol based on IEEE 802.11.

In the embodiment of FIG. 1, the server 125 is configured to communicate with the ARC 128, for example by PSTN, Ethernet, cellular or wireless communication. Thus, the mPERS device 200 and/or control hub 105 may be configured to communicate with the ARC 128 via the server 125. In other embodiments, one or both of the mPERS device 200 and/or control hub 105 may be configured to communicate directly with the ARC 128 without the communication passing through the server 125.

Figure 2A:
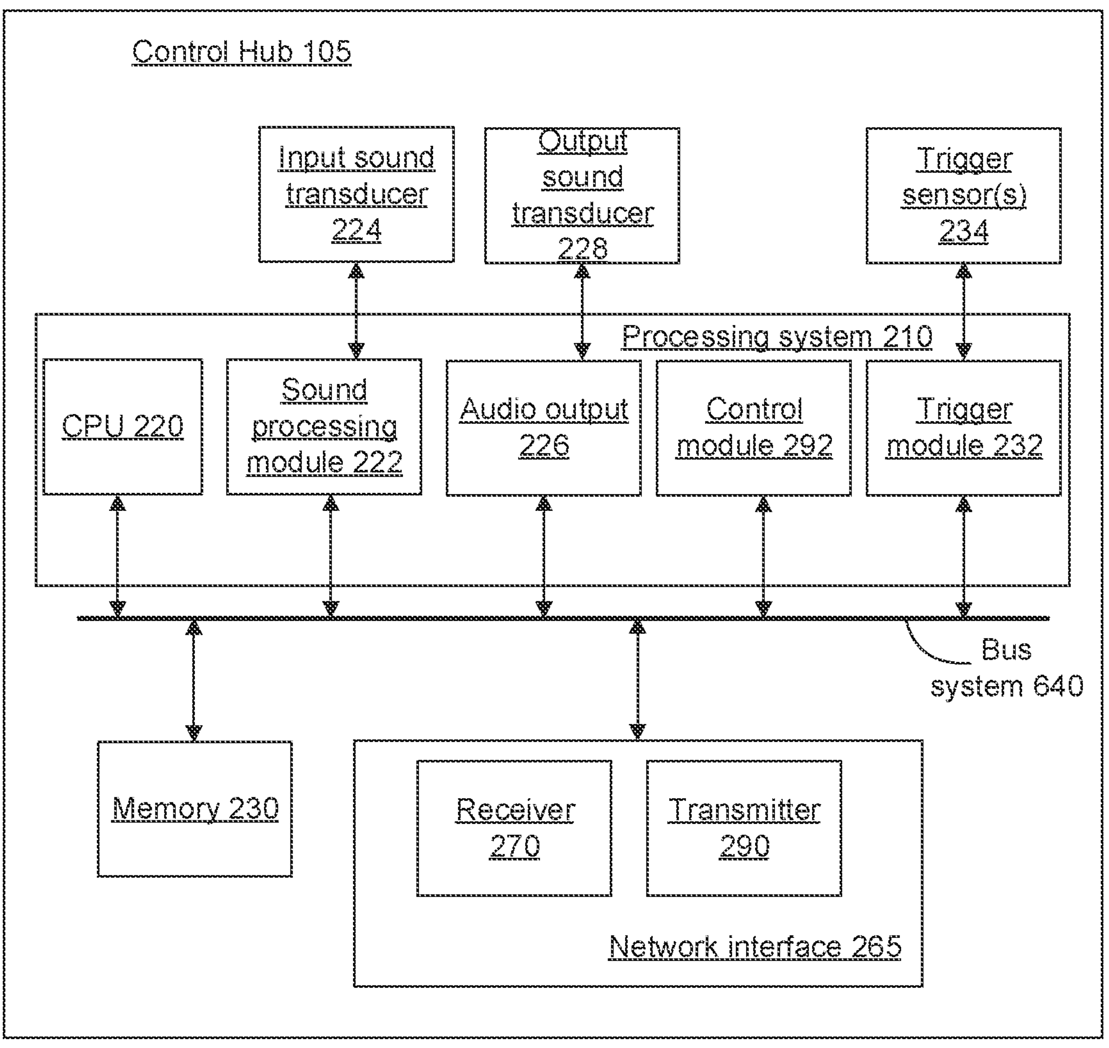
FIG. 2A is a schematic illustration of a control hub which may be or form part of the emergency call capable system in an embodiment.

FIG. 2A is a schematic illustration of an exemplary emergency call capable system 100 in the form of the control hub 105. The processing means 115 of the control hub 105 comprises a processing system 210 comprising one or more processing devices. The processing system 210 may have a central processing unit (CPU) 220 that may be coupled to a memory 230 by a bus system 240. In other examples, more than one CPU 220 may be implemented. The CPU 220 may include function specific processing hardware, e.g. one or more graphics processors, sound processors, digital-signal processors, or the like. In other examples, the processing system 210 may alternatively or additionally comprise one or more Application Specific ICs (ASICs), Field-Programmable Gate arrays (FPGAs), microcontrollers, programmable logic, or the like.

In some embodiments, the memory 230, which may comprise a non-transient memory, stores a computer program product comprising instructions for execution by the CPU 220. The memory may comprise transient memory, e.g. a RAM based memory etc. The memory may comprise non-transient memory, e.g. a flash memory etc. The instructions, when executed by the CPU 220, cause the processing system 210 to carry out methods as described below with reference to FIGS. 4 to 6.

The communications apparatus 120 of the control hub 105 comprises a network interface 265 comprising a receiver 270 and a transmitter 290. Although the example of FIG. 2A describes a single receiver 270 and a single transmitter 290, in other embodiments one or more transceivers may be implemented. Any suitable number of receivers and/or transmitters may be provided.

The receiver 270 and transmitter 290 are configured for cellular communication, for example as according to 3GPP technologies, to communicate with the server 125 or ARC 128. The receiver 270 and transmitter 290 may also be configured to use Wi-Fi® or any other wireless gateway technologies for accessing a Wide Area Network (e.g. the Internet) to thereby communicate with the server 125 or ARC 128. Additionally, the network interface 265 may provide Bluetooth®, e.g. Bluetooth® Low energy (BLE), IEEE 802.15.4 compliant transceivers or other transceivers for relatively local communications.

The processing system 210 further comprises a sound processing module 222 coupled to the bus system 240. The sound processing module 222 is coupled to an input sound transducer 224 of the control hub 105. The input sound transducer 224 is configured to sense audio, for example speech produced by the user, and to output a sensed audio signal. The sound processing module 222 is configured to convert the sensed audio into audio data, as described further below with reference to FIG. 3. The processing system 210 further comprises a control module 292 coupled to the bus system 240 and configured to control the audio data output by the sound processing module 222 as described further below with reference to FIG. 3.

The processing system 210 also comprises a audio output module 226 coupled to the bus system 240. The audio output module 226 comprises a digital to analog converter and is coupled to an output sound transducer 228 of the control hub 105. The audio output module 226 is configured to receive data that is representative of sound to be output, for example speech to be output, and to convert the data into an output electrical signal. The output sound transducer 228 is configured to output an audio output based on the output electrical signal.

The processing system 210 further comprises a trigger module 232 coupled to the bus system 240 and to determine that a trigger event occurred by processing output of at least one trigger sensor 234 and/or from at least one external trigger sensor, which optionally may be in wireless communication with the control hub 105. The trigger sensor 234, or the trigger module 232 processing the output of the trigger sensor 234, may identify a distress state and/or a fall state associated with a person. For example, a trigger sensor 234 may be a distress button to identify a distress state Additionally or alternatively a trigger sensor 234 may comprise a sensing system of an active reflected wave sensing module, e.g. an antenna array of a radar, for detecting a fall state. In other examples, triggers may additionally or alternatively be in relation to one or more monitored physiological parameters, e.g. vital signs. The trigger sensor may comprise a health and/or care monitoring device. The trigger sensor may comprise a camera.

Triggers may be based on voice detection, for example voice detection using the input sound transducer 224 and sound processing module 222, or using voice extender device 155. The sound processing module 222 may be configured to execute at least one voice recognition algorithm to identify a distress sound or specified word or phrase voiced by the person (e.g. "help", "call 911" or "I've fallen") and to determine that a trigger event has occurred based on the identifying of the distress sound or word or phrase. The voice recognition algorithm may detect panic in the audio response received from the user.

The trigger sensor may comprise a motion sensor. The trigger sensor may comprise a door/window sensor. The trigger sensor may comprise an active reflected wave range measuring device or part thereof, e.g. a 2D or 3D radar or other multidimensional sensor such as sonar or lidar.

Although only one trigger sensor 234 is depicted in FIG. 2A, it will be understood that in other embodiments a plurality of trigger sensors may be implemented.

It will be appreciated that in other examples, different architectures may be implemented. For example, the processors may comprise a plurality of CPUs. Other memory architectures may be implemented, for example memories local to the CPU such as caches and high speed RAMs, and the computer program product may be at least partly stored in such memories.

Optionally one or more of the control module 292, the trigger module 232, the audio output module 226, the sound processing module 222 may be integrated into the CPU 220.

Furthermore, although the computer program product comprising instructions for execution by the CPU 220 is described as being stored external to the processing system 210, in some examples processing and memory functions may be provided by a single chip. Alternatively, a remote storage such as a server or distributed storage may comprise some or all of the instructions. In some examples, the computer program product comprising instructions for execution by the CPU 220 may be stored on computer readable medium such as a dongle or USB memory card, an expansion card, or the like, for coupling to the control hub 105. Indeed, the instructions may be provided on any non-transient memory, e.g. any solid state memory (e.g. flash memory), magnetic (e.g. magnetic hard drive) or optical non-transient memory (e.g. CD or DVD).

Figure 2B:
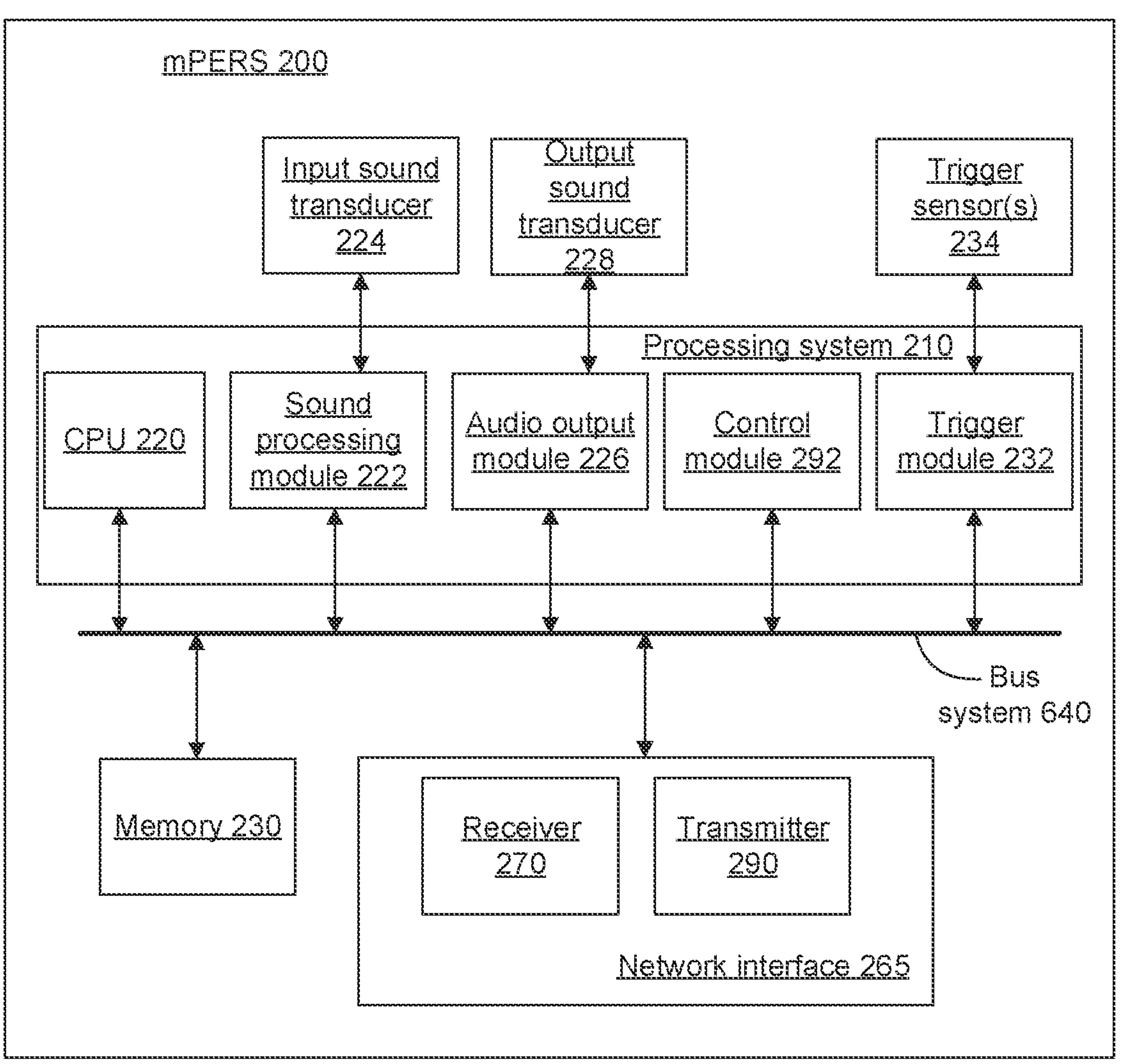
FIG. 2B is a schematic illustration of a mobile personal emergency response system (mPERS) device which may be the emergency call capable system in another embodiment.

In another embodiment, the emergency call capable system 100 may comprise or be in the form of an mPERS device 200, such as illustrated in the exemplary schematic illustration of FIG. 2B. The mPERS device 200 may have the same features as described above in relation to the control hub 105, and so like numerals are used in the FIGS. 2A and 2B to denote like components. However, unlike the case of control hub 105, the trigger module 232 generally only processes signals from trigger sensors 234 integrated into the mPERS device 200 itself. One example of such a trigger sensor is a distress button. Another example of such a trigger sensor is an accelerometer, based on which the mPERS device 200 may detect a fall by a wearer of the device 200.

Figure 3:
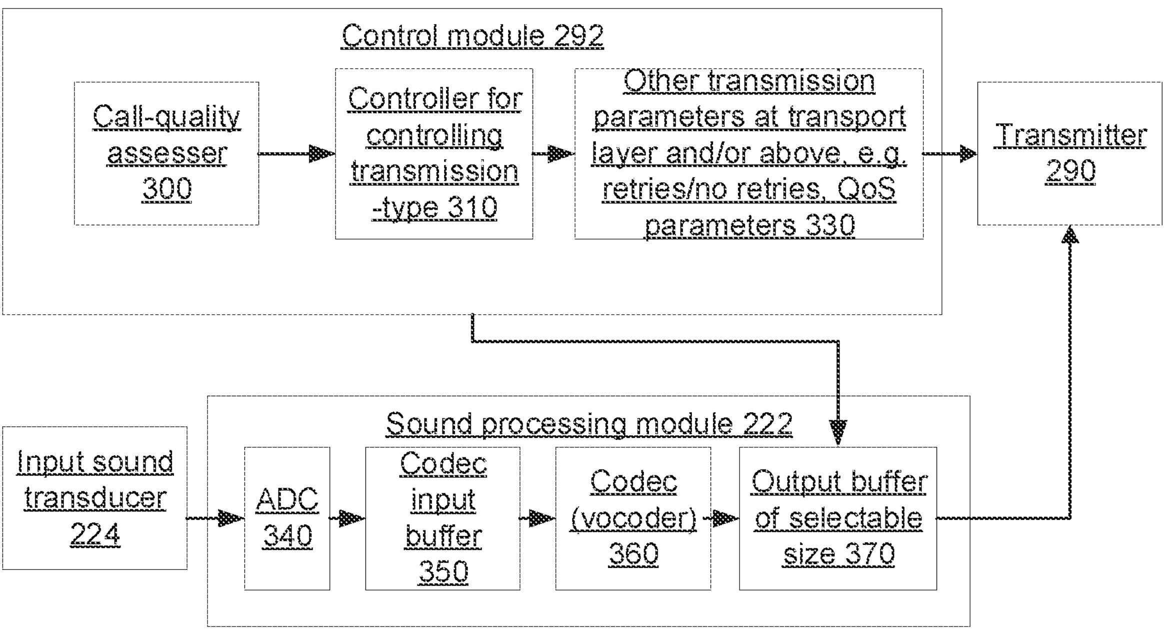
FIG. 3 is a process flow diagram showing operation of specific elements of the control hub or mPERS device in an embodiment.

FIG. 3 is a process flow diagram showing operation of specific elements of the emergency call capable system 100 comprising the control hub 105 of FIG. 2A or the mPERS device 200 of FIG. 2B to transmit data to the server 125. The control module 292 and sound processing module 222 of FIG. 2A or 2B are illustrated in greater detail in FIG. 3.

The emergency call capable system 100 is configured to provide transmission of two different types. In a first type of transmission, end-user audio data is transmitted to the server 125 over a voice call. The end-user audio data is transmitted in real time. In a second type of transmission, a messaging process is performed in which an audio response of the end user is captured and a message is transmitted, the message comprising a representation of the captured audio response. The transmission of the message is not constrained to be transmitted in real time with respect to sensing of said captured audio response.

When a call is initiated, the first type of transmission is used to provide a real-time voice call, which in the embodiment of FIG. 3 is a cellular voice call between the emergency call capable system 100 and voice server 126, which may forward voice data to and from the call center 129 to institute a voice call between the emergency call capable system 100 and the call center 129. The voice server 126 is illustrated in FIG. 1 as being part of the server 125, but in other embodiments the voice server 126 may be integrated into the ARC 128. Likewise the data server 127 may be integrated into the ARC. In some circumstances, the call is connected but has unsatisfactory quality. For example, a call operator at the call center 129 may not be able to hear what is being said by the person speaking into the emergency call capable system 100. In response to a determination that the connected cellular voice call is of insufficient quality, the emergency call capable system 100 switches to the second type of transmission comprising the messaging process. The messaging process comprises recording the voice of the end user and transmitting a message based on the voice to the ARC 128 via the server 125, more particularly, the data server 127.

In contrast with end-user audio data transmitted over a voice call, the message is not transmitted in real time relative to the voice that is captured. Instead, the message is recorded over an extended period (for example, several seconds or more) and is sent after it is recorded. Therefore, in the case of poor cellular transmission, transmission shifts from a voice call to a messaging process.

In some embodiments, the first type of transmission is performed over a first channel and the second type of transmission is performed over a second, different channel. In some embodiments, a first transmission protocol is used for the first type of transmission and a second, different transmission protocol is used for the second type of transmission. For example, the first transmission protocol may be User Datagram Protocol (UDP) and the second transmission protocol may be Transmission Control Protocol (TCP). The transmission protocols are protocols at application layer. A messaging protocol may be in contrast with a phone call which may be provided via VoIP. The message may be transmitted at a lower data rate than the voice call.

In some embodiments, the first type of transmission comprises transmission to a first destination address and the second type of transmission comprises transmission to a second, different destination address. For example, data packets that form part of a message may be addressed to a data server while data packets that form part of the voice call are addressed to a voice server. In other embodiments, packets may be sent to a single address and then sorted and delivered to different servers. Thus, for embodiments in which the data server 127 is collocated with voice server 126, all packets sent from the emergency call capable system 100 may optionally be addressed to the server 125 which may then direct each packet to the voice server 126 or data server 127, depending on a parameter in each packet selectively identifying the packet as corresponding to either the voice call of the messaging process. Alternatively different destination addresses may be included in each packet for voice packets and message packets to direct the packets directly to the voice server 126 and data server 127, respectively, without a common intermediate server interface.

Turning to the control module 292, the control module 292 comprises a call-quality assessor 300 configured to provide an assessment of call quality. The call-quality assessor 300 is configured to determine whether voice data is of sufficient quality for transmitting as a voice call. Various methods of assessing call quality are described below with reference to FIG. 6.

The control module 292 comprises a controller 310 for controlling the type of transmission. The controller 310 determines whether transmission is to take place using the first type of transmission or the second type of transmission.

The controller 310 may switch the transmission type from the first type to the second type. The type of transmission may be based on the determination by the call-quality assessor 300 of whether the voice data is of sufficient quality for transmitting as a voice call.

The control module 292 is further configured to determine other transmission parameters 320 at transport layer and/or above. For example, the other transmission parameters 320 may include whether retries or no retries are to be used. In the embodiment of FIG. 3, retries are omitted for transmission of a voice call, but are included when performing messaging. Error correction may be included for messaging, but may not be included for a voice call.

The other transmission parameters may comprise quality of service (QOS) parameters, which may be network performance parameters. For example, for a voice call, one-way a packet delay may be expected to be smaller than a few hundred milliseconds, for example less than 1 second or less than 200 ms or less than 150 ms. Jitter may be required to be smaller than an output buffer 370, preferably smaller than half the size of the output buffer 370. For example, jitter may be targeted at less 1 second or less than 200 ms or less than 30 ms. A bit rate may be required to be at least as much as a bit rate from the output buffer 370, but preferably higher. Packet loss may be required to be less than 50% or less than 40% or less than 30% or less than 20% or less than 10%. It may be required that data to be transmitted as a voice call should meet a plurality of required QoS parameters. In embodiments, any one or more of the exemplary values or ranges for QoS parameters listed above may be applied, in any combination. A set of required QoS parameters may include requirements for any one or more of packet delay, jitter, bit rate and packet loss, or any other suitable QoS parameter(s), for example bit error rate or latency.

In other embodiments, the functionality of the control module 292 may be incorporated in any suitable component of the processing system 210.

An input sound transducer 224 converts sound, typically comprising speech of the user, into an analog signal which is received by the sound processing module 222. The sound processing module 222 comprises an analog-to-digital converter (ADC) 340 which converts the analog signal into a digital signal. The digital signal is input to a codec input buffer 350 of the sound processing module 222, and from the codec input buffer 350 into a codec (vocoder) 360 of the sound processing module 222. The codec 360 processes the digital signal to obtain audio data suitable for transmission. For example, the processing of the digital signal may comprise compression. The audio data that is output by the codec 360 may be stored in an output buffer 370 of the sound processing module 222 and transmitted therefrom, or the audio data that is output by the codec 360 may be transmitted without buffering. Thus, an output buffer 370 may be included having selectable size that may be as small as zero or as large as 10 seconds or longer (e.g. 30 seconds). A size of the output buffer 370 may be measured as a delay that the output buffer 370 causes to transmission. A size of the output buffer 370 is selected in dependence on a type of transmission as determined in the control module 292. In some embodiments, different codecs and/or different output buffers may be used for the different types of transmission.

If the type of transmission is a voice call, then to meet acceptable QoS performance the output buffer size is generally less than 150 ms (e.g. 100 ms or less), or may even be non-existent, so that one-way latency (mouth to ear) is kept at a low level, e.g. 1 second or less. If the type of transmission is messaging, then the output buffer size may be as long a maximum allowable total duration of a voice message, which may generally be at least several seconds, for example at least 5 seconds, for example at least 10 seconds, for example 15 seconds or 30 seconds.

A small buffer means less latency, which may be necessary for a voice call. However, a small buffer means smaller messages, which is worse for use in messaging mode. The use of a selectable size output buffer 370 may allow use of the emergency call capable system 100 in both voice call and messaging modes.

The audio data is passed from the output buffer 370 to the transmitter 290. The transmitter 290 transmits the audio data using a transmission type and transmission parameters determined by the control module 292.

Figure 4:
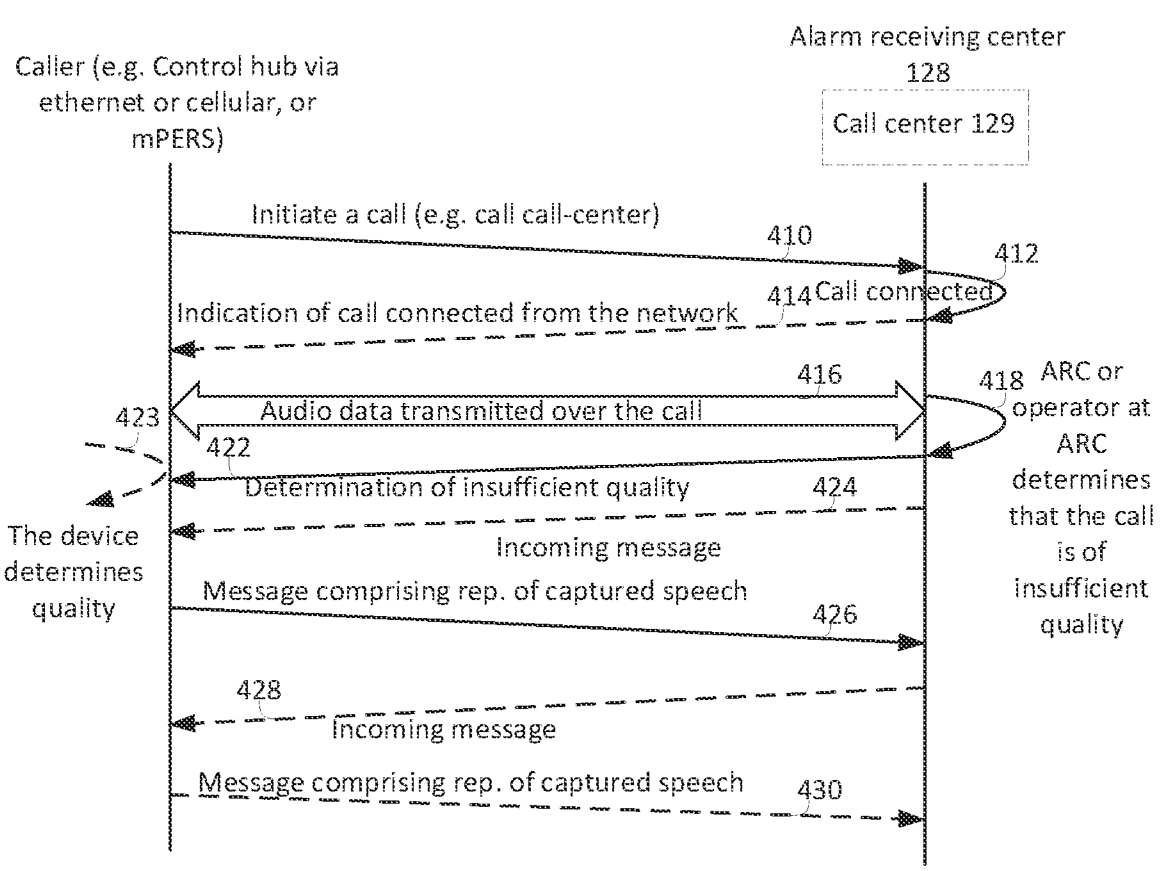
FIG. 4 is a sequence diagram showing an exemplary communication between a caller and an Alarm Receiving Center.

FIG. 4 is a sequence diagram showing communication between a caller (i.e. the device or system that makes the call) and an ARC 128, in accordance with an embodiment. Some or all of the communication between the caller and the ARC 128 may be via the server 125 comprising the voice server 126 and the data server 127. The server 125 is not shown in FIG. 4, but may optionally be partly or wholly intermediate the ARC 128 and the caller in an embodiment, or optionally be partly or wholly integrated into the ARC 128 in another embodiment. In the present embodiment, the caller is referred to as being the mPERS device 200, which communicates with the server 125 using cellular communication. However, the caller may alternatively be the control hub 105 or other emergency call capable device, especially one which uses cellular communication for the call.

At an initial step 410, a call to the call center 129 of the ARC 128 is initiated by the caller. The processing system 210 of the mPERS device 200 is configured to instruct the transmitter 290 to initiate a VoIP or other voice call via cellular communication that passes via the server 125 (not shown in FIG. 4).

The initiating of the call may be automatic. The initiating of the call may be in response to the identification of a trigger event by the trigger module 232, for example a detected emergency event such as a fall. The trigger event may be identified by processing an output of the trigger sensor 234. The processing system 210 may instruct the transmitter 290 to send signals to the server 125 to identify the trigger event (not shown in FIG. 4). The server 125 may process the signals and reply with a response signal (not shown in FIG. 4), after which the call is initiated. Alternatively, the initiating of the call may be in response to a command from the user which may be received by a microphone or actuator, for example.

At step 412, the call is connected at the ARC 128.

At step 414, the ARC 128 sends to the mPERS device 200 an indication that the call has been connected. The receiver 270 receives the indication that the call has been connected and passes a corresponding signal to the processing system 210. In some embodiments, step 414 may be omitted.

At step 416, the mPERS device 200 transmits audio data over the call. The audio data is streamed in real time. An end user, for example a person wearing the mPERS device 200, speaks with the intention of communicating with an operator at the call center 129 of the ARC 128. The speech is converted into an analog signal by the input speech transducer 224 and converted to audio data by the codec 360 as described above with reference to FIG. 3. The audio data comprises a plurality of packets. A size of the output buffer 370 is selected to be relatively small, for example less than 100 ms, or may be non-existent. Transmission of the audio data as part of the voice call is performed in real time. Transmission parameters are selected to provide a QoS that is appropriate for a voice call, for example as described herein. In the embodiment of FIG. 4, the transmission protocol for the voice call is UDP, and no retries are used.

At step 418, the ARC 128 determines that the call is of insufficient quality. Various methods of determining that the call is of insufficient quality are described below with reference to FIG. 6. The determination of the call being of insufficient quality may be automatic or may be determined by a person, for example the person taking the call at the ARC 128. In one example, the ARC 128 determines that the call is of insufficient quality if packet loss is above a predetermined threshold value for packet loss, for example 10% and/or if any of the other QoS metrics referred to herein are determined to be inappropriate for a voice call, for example as described herein. In another example, an operator, for example the person taking the call at the call center 129, may determine that the quality of the call is insufficient. For example, the operator may not be able to hear the call well enough to obtain information from the user. The ARC 128 may determine that the call is of insufficient quality based on an input from the operator.

At step 422, the ARC 128 transmits to the mPERS device 200 signals representative of the determination made by the ARC 128 that the call is of insufficient quality. The signals are received by the mPERS device 200 and processed by the processing system 210.

However in some embodiments, step 423 is performed instead of, or in addition to, step 418. At step 423, the mPERS device 200 determines a quality of the call. For example, the quality of the call may be determined by the call-quality assessor 310. For example one or more of the QoS metrics referred to herein may be measured by the receiver of voice data packets sent from the mPERS device, e.g. measured by voice server 126, and the measurement(s) may be transmitted to mPERS device 200 by the data server 127, and the mPERS device 200 may thereafter determine whether the appropriateness of the measurement(s) for a voice call. Thus, the communication indicated at step 422 may, instead of providing a determination of insufficient quality, provide metrics upon which the mPERS device 200 may make such a determination. Additionally or alternatively the call-quality assessor 310 may make such a determination based on voice data packets that it receives during a call.

In any case, in response to the determination that the call is of insufficient quality, a messaging process commences. The mPERS device 200 starts using the second type of transmission, which is the messaging mode. In the embodiment of FIG. 4, the second type of transmission is by TCP, supporting the use of retries. Transmission of messages may therefore be more reliable than transmission of the voice call.

The messaging process comprises a messaging dialogue between an operator at the call center 129 of the ARC 128 and the user of the mPERS device 200. Various possible messages may be optionally be pre-stored in a database, for example a database of the call center 129 and/or in the memory 230 of the mPERS device 200.

The processing system 210 of the mPERS device 200 may instruct the transmitter 290 to terminate the voice call in response to receiving the determination that the voice call is of insufficient quality, or in response to switching to the messaging mode. In other embodiments, the voice call may not be terminated on switching to the messaging mode. In yet other embodiments, the voice call may remain connected to the remote system during at least part of the messaging process. At least part of the messaging process may be performed concurrently with at least part of the voice call.

At step 424, signals representative of an incoming message are transmitted by the ARC 128 and received and processed by the mPERS device 200. For example, the incoming message may ask the user 'where are you?', and/or 'what is your name?'. For example, the incoming message may comprise data that is representative of a recording of an operator's speech. The data is processed by audio output module 226 which sends an output electrical signal to output sound transducer 228. The output sound transducer produces audio output comprising speech that is audible to the user. In an alternative embodiment, a pre-configured and pre-stored initial message may be played to the user. Thus, in some embodiments, step 424 may be omitted or the message provided at step 424 may be merely to provide the mPERS device 200 with information about the call quality.

At step 426, the sound processing module 222 receives and processes sensed audio signals from the input sound transducer 224 to capture the user's audio response over a time period. The time period may be described as a voice capture period. The duration of the voice capture period may be a predefined duration, for example 10 seconds, 20 seconds or 30 seconds. The duration of the voice capture period may be determined by processing output of the input sound transducer 224 to perform a voice detection process to determine whether a human voice is present, for example by comparing measured acoustic energy or acoustic power to a threshold value. Audio capture may cease after the end of an utterance. For example, audio capture may cease when, after an utterance, no human voice has been detected for a predetermined minimum time, for example 2 seconds, 4 seconds, or 8 seconds. The duration of the audio capture may be a lesser of a predefined maximum duration and the duration determined in dependence on the output of the voice detection process. For example, the predefined maximum duration may be 30 seconds or 60 seconds.

The processing system 210 instructs the transmitter 290 to transmit signals representative of a message comprising a representation of the captured speech to the ARC 128. For example, the message may comprise a recording of the captured speech or a transcription thereof. The message may be recorded in its entirety before it is sent, and it is not streamed in real time, in contrast with a voice call.

In embodiments in which the voice call has not been terminated earlier in the messaging process, the processing system 210 of the mPERS device 200 may optionally instruct the transmitter 290 to terminate the voice call in response to starting to capture the speech of the end user, finishing capturing the speech of the end user, or transmitting the message to the remote system.

Optionally, at step 428, signals representative of a further incoming message is transmitted by the ARC 128 and received and processed by the mPERS device 200. For example, the further incoming message may ask the end user 'what has happened?' or 'what is your condition?'. The further incoming message may comprise a recording of the operator's speech.

Optionally, at step 430, the mPERS device 200 captures the user's speech over a further time period, in which the user speaks a reply to the further incoming message. The mPERS device 200 sends signals representative of a message representative of the captured reply to the ARC 128. The message may comprise a recording of the operator's speech or a transcription thereof. Further messaging back and forth between the mPERS device 200 and ARC 128 may also occur as part of the messaging dialogue. The specific messages above are by way of example. In practice, the messages may have any suitable content to convey information from the user to the operator, or from the operator to the user. Each message may be transmitted in one or a plurality of data packets.

By sending recordings of speech via messaging, an accuracy of communication may be improved. The messaging process does not require real time transmission. Since the transmission is not constrained to be in real time, a lower bandwidth or lower quality connection may still achieve reliable transmission. Retries may be used to reduce a number of lost packets.

Figure 5:
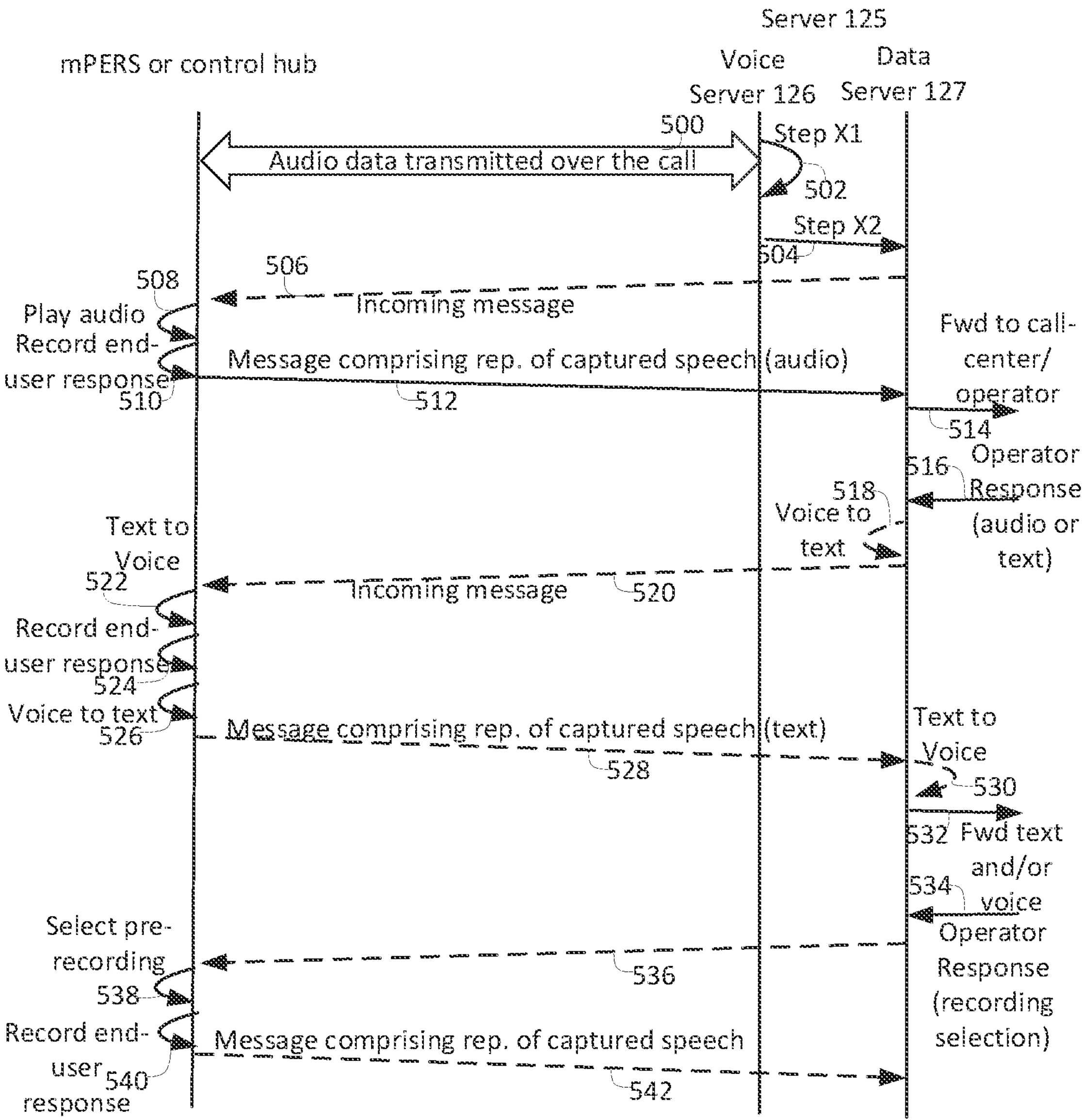
FIG. 5 is a sequence diagram showing communication between a control hub or an mPERS device and a server in an embodiment.

In some embodiments, instead of providing recorded speech, the messages comprise a more efficient representation of the speech of the user or operator. For example, speech may be represented by text or by a predetermined code from a plurality of codes corresponding to respective predefined phrases. Such messages are described below with reference to FIG. 5. FIG. 5 is a sequence diagram showing communication between an emergency call capable system 100 and a server 125. The emergency call capable system 100 may for example be the mPERS device 200 or control hub 105. The server 125 comprises a voice server 126 and a data server 127, as described above.

Also included in FIG. 5 is onwards communication between the server 125 and the ARC 128, or if the server 125 is integrated into the ARC 128 then between the server 125 and the call center 129 of the ARC 128. The ARC 128 itself is not represented in FIG. 5.

FIG. 5 illustrates multiple different methods of messaging between the system 100 and data server 127. Optionally the different methods of messaging may be used at different stages or rounds of a messaging process, but in other embodiments the same method of messaging may be employed at each stage or round of the messaging process.

In an initial step 500, audio data is transmitted over a voice call. The audio data is transmitted to a voice server 126 of server 125.

At step 502, represented as step X1 in FIG. 5, the voice server 126 performs a determination that the call is of insufficient quality by analysing packets received from the system 100. For example, the voice server 126 may determine that the call is of insufficient quality if packet loss is above a predetermined threshold value for packet loss, for example 10% or according to any other test described herein.

At step 504, represented as step X2 in FIG. 5, the voice server 126 sends the determination that the call is of insufficient quality to the data server 127. Alternatively an operator at the call center may make the determination and input their determination into the data server 127.

The determination of insufficient quality may be transmitted from the ARC 128 to the data server 127 and from the data server 127 to the system 100.

In another embodiment, the voice server may be incorporated in the system 100 and the determination of insufficiency of the call quality may be in accordance with any other method described herein, but instead of being assessed based on voice data packets received from the system 100 the call quality is assessed based on voice packets received from the ARC 128 over the voice call. However, such an arrangement may be non-preferred since it increases processing demands on the system 100, and potentially reduces battery lifespan.

At step 506, the data server 127 transmits an incoming message to the system 100. The incoming message comprises a recorded audio message. For example, the recorded audio message may comprise the question 'where are you?'. The recorded audio message may be obtained by capturing speech of an operator, or may be a pre-recording that is stored by the server 125 or ARC 128. The pre-recording may be selected by the operator.

At step 508, the audio output module 226 of processing system 210 instructs the output sound transducer 228 to produce audio output comprising the recorded audio message. The recorded audio message is played such that the user can hear it.

At step 510, the input sound transducer 224 captures an audio response of the user. For example, the user may response by stating their location. The sound processing module 222 makes a recording corresponding to the spoken response.

At step 512, the sound processing module 222 instructs transmission of a message comprising the recording of the spoken response. The message is transmitted to the data server 127. The message may be transmitted using a lower data rate than the data rate required to transmit a voice call. At step 514, the data server 127 forwards the message to the call center 129 of the ARC 128.

At step 516, the data server 127 receives a response from an operator of the call center 129. The response may comprise audio data, text data and/or other data. A scenario in which the response comprises audio data is now described.

At step 518, the data server 127 processes the audio data of the operator response to convert the audio data into text data, thereby creating a transcription of the audio data. The conversion comprises a speech to text conversion. The audio data is representative of the operator's speech, for example representative of the operator saying the question 'what has happened?' The text data comprises the transcription of the operator's speech, for example the text 'what has happened?'. In other embodiments, step 518 may be omitted.

At step 520, the data server 127 sends an incoming message to the system 100. The incoming message comprises the text data obtained at step 518, which in this case is the text 'what has happened'. In other embodiments, step 520 may be omitted.

At step 522, the processing system 210 of the system 100 performs a text to speech conversion to convert the text data into audio data. For example, the text to speech conversion may comprise a speech synthesis process to obtain a synthesised voice. The audio output module 226 of the processing system 210 instructs the output sound transducer 228 to play the synthesised voice to the user. The transmission and playing of the incoming message of step 520 differs from the transmission and playing of the incoming message of step 506. In step 506, audio data is transmitted that is then played to the user at step 508. The user hears the voice of the operator at step 508. In step 520, the incoming message comprises text data that has been obtained by performing a speech to text process on audio data. The user hears a synthesised voice at step 522.

At step 524, the input sound transducer 224 captures an audio response of the user. The sound processing module 222 makes a recording corresponding to the spoken response.

At step 526, the processing system 210 performs a speech to text process on the recording of step 524 to obtain text data.

At step 528, the processing system 210 instructs the transmitter 290 to transmit to the data server 127 a message comprising the text data obtained at step 526. A message comprising text data may be considerably smaller than a message comprising audio data. The message comprising text data may therefore be faster and/or more efficient to transmit. The message may be transmitted using a lower data rate than the data rate required to transmit a voice call.

Optionally, at step 530, the data server 127 performs a text to voice process, for example a voice synthesis process, to obtain audio data from the message of step 528. At step 532, the data server 127 forwards the text data or the synthesised voice data to the ARC 128 or to a part thereof for displaying to an operator.

At step 534, the data server 127 receives a response from an operator of the call center 129. The response is representative of a selection of a recording. For example, the response may specify that recording number n is to be selected from a set of m numbered recordings.

At step 536, the data server 127 sends an incoming message to the system 100. The incoming message comprises the recording selection. For example, the incoming message may specify recording number n.

At step 538, the processing system 210 of the system 100 selects the specified recording, for example recording number n, from the set of numbered recordings. By sending a code specifying a selected recording, a size of the message may be minimized. The size of the message may be less than a message containing audio data or text data.

The audio output module 226 retrieves from memory 230 audio data of the selected recording and instructs the output sound transducer 228 to play the selected recording. For example, the selected recording may comprise a recording of an operator saying 'what is your condition?'.

In other embodiments, the message may comprise a text string selected from a list or typed by an operator, or a code that acts to identify such a text string. Speech may then be generated from the text (i.e. text to speech) by the audio output module 226 and played by the output sound transducer 228.

At step 540, the input sound transducer 224 captures a spoken response by the user. The sound processing module 222 makes a recording corresponding to the spoken response.

At step 542, the sound processing module 222 instructs transmission of a message comprising the recording of the spoken response. The message is transmitted to the data server 127. The message may be transmitted using a lower data rate than the data rate required to transmit a voice call.

In other embodiments, any number of messages may be exchanged between the user of the system 100 and the operator at the call center 129. For example, the operator may tell the user 'help is on its way'. The messages may represent communication by the operator and/or by the user in any suitable way. A message may comprise any suitable representation of speech, for example a recording, a transcription, or a code that is indicative of content of the speech. For example, the code may indicate whether the user has responded 'yes' or 'no'. A message from the operator may comprise text that has been input directly, for example input by the operator using a keyboard. A message from the operator may comprise a code that is indicative of content, for example indicative of a selection from a set of predetermined messages. Messages may comprise one or a plurality of commands in relation to the captured voice, for example instructing the processor to play a specified message number or to perform a text to speech operation.

Preferably, at least three messages are sent in total in the messaging dialogue: a first from the ARC 128 to prompt an answer from the person in danger; a reply from the person; and a confirmation message from the ARC 128. At least four or more preferably at least five messages may be sent, to allow at least two rounds of information to be obtained.

In the embodiments of FIGS. 4 and 5, a voice call is connected initially and transmission only switches to messaging after the connection of the voice call and once it has been determined that the ongoing call is of insufficient quality. The messaging process may allow communication with the user to be performed even when the call transmission is too poor to reliably conduct a content-critical voice conversation, for example due to poor network conditions or call performance. The user may be a person who is being monitored, and who may have important information to convey in an emergency situation, and any loss or distortion of verbal expressions may hinder provision of a quick and appropriate response. By switching to messaging, the information may be transmitted even when a quality of voice call is capable of continuing but is too poor for the user to be reliably and entirely heard. A mode of transmission may be changed without input from the user. For example, the mode of transmission may be changed automatically based on a determination of call quality. When transmission has switched to the messaging process, the user may continue to use voice to communicate, but information provided by the user may be transmitted in a message comprising a suitable representation of the user's voice input, which is not transmitted in real time. By transmitting the representation of the user's voice input as message and not in real time, a more complete and/or clearer representation of the user's voice, and/or the words the voice represents, may conveyed. An operator may be able to understand communication from the user that would not be understandable over a voice call. Information from the operator may also be transmitted to the user by a messaging process, which may allow important information to be transmitted from the operator to the user even when call quality is too poor for the information to be reliably conveyed over a voice call.

Figure 6:
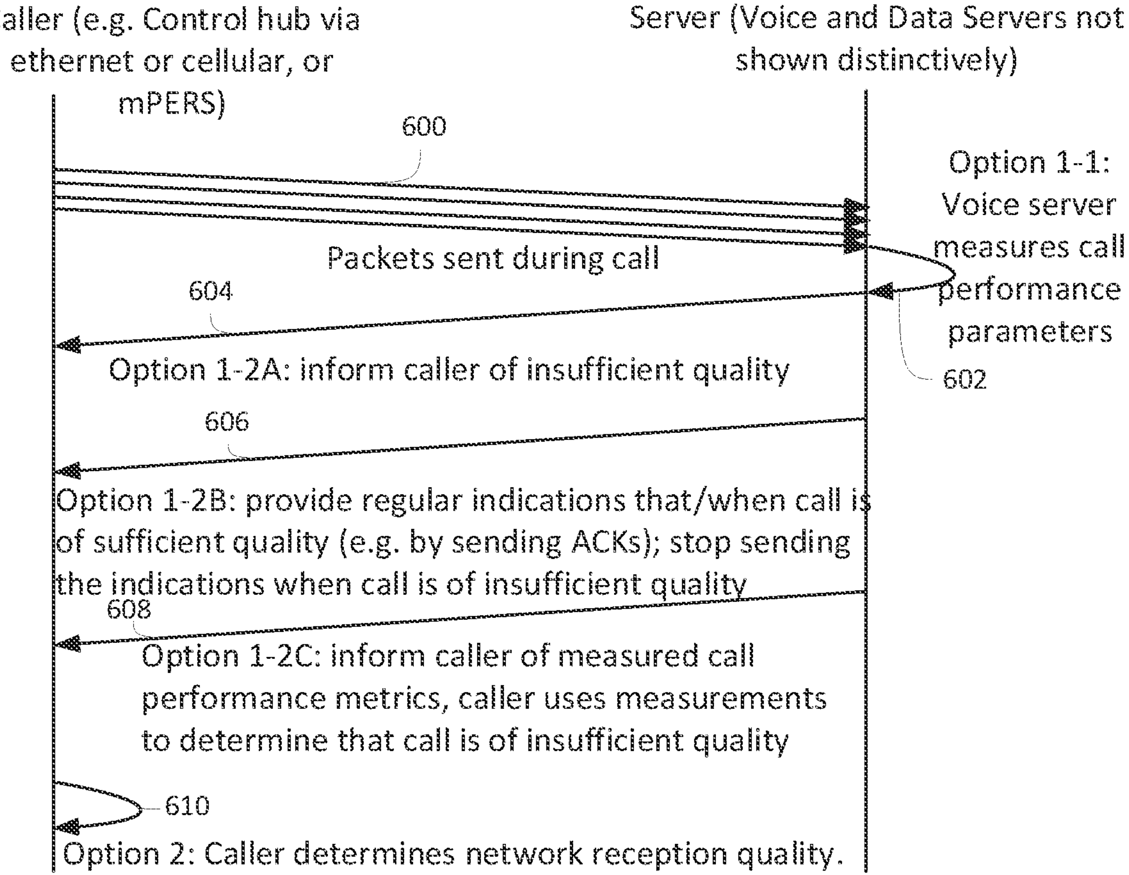
FIG. 6 is a sequence diagram depicting an exemplary automatic call quality determination method.

FIG. 6 is a sequence diagram depicting an automatic call quality determination method comprising a plurality of alternative options. FIG. 6 represents communication between a caller, for example the system 100 via cellular communications, and server 125. No distinction between the voice server 126 and data server 127 of server 125 is shown in FIG. 6.

At step 600, a voice call comprising a plurality of packets is transmitted from the caller to the server 125.

At step 602, designated as Option 1-1, the voice server 126 measures call performance parameters for the voice call. For example, the voice server 126 may measure the call performance parameters based on the time of arrival of each packet of a known sequence of packets (e.g. by the packets including respective numbers representing their place in an order in which they are transmitted). QOS parameters are determined by the voice server 126.

Steps 604, 606 and 608 each show different options for response to the determining of the call performance parameters, designated Options 1-2A, 1-2B and 1-2C respectively.

At step 604, which is Option 1-2A, the voice server 126 sends a message informing the caller that the call is of insufficient quality. The message may explicitly include an indication that the call quality is insufficient. Alternatively, the sending of the message may let the caller know by implication that the call quality is deemed insufficient. For example, the message may be a message that would only be sent if the call quality were deemed insufficient.

Step 606, which is Option 1-2B, is an alternative to step 604. In the option of step 606, the voice server 126 provides regular indications that the call is of sufficient quality for as long as the call remains of sufficient quality. For example, the indications may comprise acknowledgements (ACKs). Once the voice server determines that the voice call is of insufficient quality, the voice server 126 stops sending the indications that the call is of sufficient quality, for example by stopping sending ACKs. The caller may infer that the call is of insufficient quality when the caller does not receive the ACKs or other awaited indication of sufficient quality, for example if the indication is not received within a predefined time interval.

Step 608, which is Option 1-2C, is an alternative to steps 604 and 606. At step 608, the voice server 126 sends a message informing the caller of the measured call performance metrics, such as described herein, and the caller then decides based on the received measurements whether the call is of insufficient quality, rather than that decision being done by the voice server 126. Additionally or alternatively, but more preferably additionally, an arrangement may be included in which the roles illustrated in FIG. 6 Option 1-1 are reversed, whereby the call quality is assessed in relation to operator voice data. Option 1-1 may be performed by, for example, the system 100 measuring call performance parameters for the voice call from the operator and determining that the call is of insufficient quality, in which case Option 1-2 may comprise informing the server 125 of the determination that the call is of insufficient quality.

Step 610, designated as Option 2, provides an alternative or additional method of determining that the voice call is of insufficient quality. At step 610, the caller determines network reception quality. If network reception quality is poor, the caller concludes that the call quality over that network is at that time expected to be insufficient, since low reception will generally result in poor QoS parameters. By measuring network reception quality at the device, poor call quality can be inferred without having to directly measure it. Optionally, the system 100 may thereby automatically switch to the messaging mode based on an inferred insufficient quality rather than based on an analysis of voice packets transmitted during the call.

In embodiments shown in FIGS. 4 to 6, the caller is typically the system 100. The system 100 calls the server 125 which forwards audio data and messages to the ARC 128. The server may forward audio data and messages from a large number of emergency call capable systems 100, for example hundreds of emergency call capable systems 100 or more.

Optionally for embodiments in which the emergency call capable system 100 comprises a control hub 105 and a voice extender 155, the control hub may place the call and relay information between (i) the server and/or ARC and (ii) the voice extender. Signals obtained from an input sound transducer in the voice extender 155 may be sent to the control hub at which point the signals may be processed and resulting audio data or messages sent to the server or to the ARC directly. Audio data or messages received by the control hub may be processed and resulting signals sent to an output sound transducer of the voice extender 155. For such embodiments the voice extender 155 may provide some of the elements presented in FIG. 3, for example, the input sound transducer 224, and some or all of the sound processing module, with the other elements of FIG. 3 being provided by the control hub 105.

While in the example herein the system 100 initiates the voice call, in alternative embodiments, the server initiates the call, for example in response to a message from the system 100 indicating the occurrence of a trigger event. Thus, the actions of the caller referred to herein may alternatively be more generally understood to be actions of user equipment. Thus the user equipment may initiate the calls referred to herein, or in other embodiments may receive the calls referred to herein, or in yet other embodiments may be capable of both initiating and receiving such calls.

As used herein, unless context demands otherwise, the expression "one or more of x and y" or "at least one of x and y", should be interpreted to cover: (i) at least one x, (ii) at least one y, (iii) at least one x and at least one y. That is, there may be, but need not be, both element x and element y. The same applies to any equivalent expressions referring to more than two elements, e.g. the expression "at least one of x, y, and z". The same interpretation should likewise be applied to the expressions "x, y, and/or z" and "at least x, y, and/or z".

Whilst the foregoing description has described exemplary embodiments, it will be understood by those skilled in the art that many variations of the embodiments can be made within the scope of the present invention as defined by the claims. Moreover, features of one or more embodiments may be mixed and matched with features of one or more other embodiments.

In addition, any priority document(s) of this application is/are hereby incorporated herein by reference in its/their entirety.

What is claimed is:

1. An apparatus comprising at least one processor configured to:

instruct transmission of end-user audio data to a remote system over a voice call, wherein the end-user audio data represents a sensed audio signal to convey speech of an end user and is transmitted in real time with respect to sensing of the audio signal; and in response to a determination that, during the voice call, the voice call is of insufficient quality, perform a messaging process, the messaging process comprising:

presenting an audio output to the end user;

capturing an audio response of the end user; and instructing transmission of a message to the remote system, wherein the message comprises a representation of the captured audio response, and wherein the transmission of the message is not constrained to be transmitted in real time with respect to sensing of said captured audio response;

wherein the messaging process comprises a messaging dialogue between the end user and the remote system or a human operator of the remote system, the messaging dialogue further comprising receiving signals representative of an incoming message received from the remote system, wherein the incoming message identifies information to be presented to the end user, and instructs a corresponding audio output to the end user.

2. The apparatus of claim 1, wherein the initiating of the voice call is in response to a detected emergency event.

3. The apparatus of claim 1, wherein transmitting of the audio data in real time is provided by configuring a quality of service, QoS, to be for the voice call and wherein the transmission of the audio data comprises transmission using a first protocol and the transmission of the message comprises transmission using a second, different protocol, wherein the first protocol is User Datagram Protocol, UDP and the second protocol is Transmission Control Protocol, TCP.

4. The apparatus of claim 1, wherein the apparatus comprises a first output buffer configured to buffer the end-user audio data before transmitting the end-user audio data over the voice call, wherein the first output buffer contributes a delay of no more than 100 ms to the transmitting of the end-user audio data.

5. The apparatus of claim 1, wherein the apparatus comprises a second output buffer configured to buffer the audio response, wherein the second output buffer contributes a delay of more than 10 seconds to transmission of the message.

6. The apparatus of claim 1, wherein the at least one processor is configured to obtain the determination that the voice call is of insufficient quality based on network performance parameters determined by a recipient of the end user audio data, the network performance parameters being received by the apparatus, or wherein the determination that the voice call is of insufficient quality is received from a remote device, or wherein the determination that the voice call is of insufficient quality is obtained based on a measurement of network reception at the apparatus, wherein the apparatus assumes the voice call is of insufficient quality based on a determination that network reception is below a predetermined threshold.

7. The apparatus of claim 1, wherein the message comprises one or more of a) to b):

a) a transcription of the captured audio response, wherein the at least one processor is configured to perform speech to text processing of the captured audio response to obtain the transcription; or b) a code that is indicative of content of the captured audio response, wherein the code corresponds to a selection from a plurality of predefined expected audio responses that is determined to match said audio response.

8. The apparatus of claim 1, wherein at least one of a) to c):

a) the incoming message comprises an audio recording of an operator, and the audio output comprises outputting the recording;

b) the incoming message comprises a transcription of an audio recording of an operator, and the at least one processor is configured to perform text to speech processing of the incoming message to obtain the audio output, the audio output comprising an audio version of the transcription; or c) the incoming message comprises a code identifying the information to be presented to the end user, and the at least one processor is configured to select the audio output from a plurality of known audio outputs based on the code.

9. The apparatus of claim 1, wherein the at least one processor is further configured to, in response to receipt of the incoming message, capture a further audio response of the user of the apparatus and instruct transmission of a further message comprising a representation of the captured further audio response.

10. The apparatus of claim 1, wherein the apparatus comprises a mobile personal emergency response system, mPERS, device.

11. A system comprising:

the apparatus of claim 1; and at least one device from which the apparatus can receive a signal and detect an emergency event based on the received signal.

12. A method comprising:

instructing transmission of end-user audio data to a remote system over a voice call, wherein the end-user audio data represents a sensed audio signal to convey speech of an end user and is transmitted in real time with respect to sensing of the audio signal; and in response to a determination that, during the voice call, the voice call is of insufficient quality, performing a messaging process, the messaging process comprising:

presenting an audio output to the end user;

capturing an audio response of the end user; and instructing transmission of a message to the remote system, wherein the message comprises a representation of the captured audio response, and wherein the transmission of the message is not constrained to be transmitted in real time with respect to sensing of said captured audio response, wherein the messaging process comprises a messaging dialogue between the end user and the remote system or a human operator of the remote system, the messaging dialogue further comprising receiving signals representative of an incoming message received from the remote system, wherein the incoming message identifies information to be presented to the end user, and instructing a corresponding audio output to the end user.

13. A system configured to perform the method of claim 12.

14. A computer program product comprising instructions which, when the program is executed by a computer, cause the computer to carry out the method of claim 12.

15. The method according to claim 12, further comprising, in response to receipt of the incoming message, capturing a further audio response of the user of the apparatus and instructing transmission of a further message comprising a representation of the captured further audio response.

16. The method according to claim 12, wherein the initiating of the voice call is in response to a detected emergency event.

17. The method according to claim 12, wherein the message comprises one or more of a) to b):

a) a transcription of the captured audio response, wherein the at least one processor is configured to perform speech to text processing of the captured audio response to obtain the transcription; or b) a code that is indicative of content of the captured audio response, wherein the code corresponds to a selection from a plurality of predefined expected audio responses that is determined to match said audio response.

18. The method of claim 12, wherein the incoming message comprises an audio recording of an operator, and the audio output comprises outputting the recording.

19. The method of claim 12, wherein the incoming message comprises a transcription of an audio recording of an operator, and the at least one processor is configured to perform text to speech processing of the incoming message to obtain the audio output, the audio output comprising an audio version of the transcription.

20. The method of claim 12, wherein the incoming message comprises a code identifying the information to be presented to the end user, and the at least one processor is configured to select the audio output from a plurality of known audio outputs based on the code.

* * * * *